United States Patent [19]
Greenwood et al.

[11] Patent Number: 6,030,310
[45] Date of Patent: Feb. 29, 2000

[54] VARIATOR CONTROL SYSTEM

[75] Inventors: Christopher John Greenwood, Preston, United Kingdom; Masaki Inui, Airchi, Japan; Mervyn John George Patterson, Chorley, United Kingdom; Yudai Tatara, Chizuoka, Japan

[73] Assignee: Torotrak (Development) Limited, Preston, United Kingdom

[21] Appl. No.: 09/174,184

[22] Filed: Oct. 16, 1998

Related U.S. Application Data

[63] Continuation of application No. PCT/GB97/00938, Apr. 2, 1997.

[30] Foreign Application Priority Data

Apr. 19, 1996 [GB] United Kingdom ............ 9608146

[51] Int. Cl.$^7$ ............................................. F16H 15/38
[52] U.S. Cl. ............................................. 476/10; 476/41
[58] Field of Search ................................. 476/10, 41

[56] References Cited

U.S. PATENT DOCUMENTS

| | | |
|---|---|---|
| 3,826,147 | 7/1974 | Sharpe et al. ............... 476/10 |
| 3,828,618 | 8/1974 | Sharpe et al. . |
| 4,524,641 | 6/1985 | Greenwood . |
| 4,854,920 | 8/1989 | Mimura . |
| 5,090,951 | 2/1992 | Greenwood ............... 476/10 |
| 5,308,298 | 5/1994 | Lambert ................... 476/10 |

FOREIGN PATENT DOCUMENTS

| | | |
|---|---|---|
| 0 356 102 A1 | 2/1990 | European Pat. Off. . |
| 979062 | 1/1965 | United Kingdom . |
| 1078791 | 8/1967 | United Kingdom . |
| 1 325 602 | 8/1973 | United Kingdom . |
| 2 023 753 | 1/1980 | United Kingdom . |
| 1 600 974 | 10/1981 | United Kingdom . |
| 2 100 372 | 12/1982 | United Kingdom . |
| 94/01697 | 1/1994 | WIPO . |

Primary Examiner—Tamara L. Graysay
Assistant Examiner—William C Joyce
Attorney, Agent, or Firm—Davis and Bujold

[57] ABSTRACT

A variator assembly comprises a variator of the toroidal-race rolling-traction type using double-acting pistons to control the rollers and differential end load pressure to load the variator, and control means operative to vary the differential end load pressure in sympathy with changes in the net pressure exerted by the roller-control pistons so as to maintain the traction coefficient at the roller disc interface consistently below the limit at which traction would be lost.

13 Claims, 5 Drawing Sheets

VARIATOR CONTROL SYSTEM

This is a continuation of International Application PCT/GB97/00938, with an international filing date of Apr. 2, 1997.

The invention relates to a variator control system e.g. for use in a continuously-variable-ratio transmission (CVT).

BACKGROUND OF THE INVENTION

In known variators of the toroidal-race rolling-traction type, it is well known to mount each roller in a roller carriage and to connect that carriage to a hydraulic ram subject to a controlled hydraulic force which generates opposing tangential forces (through sheer of the oil films) at the interfaces between the roller and the opposing discs.

A two-regime CVT using this type of variator, is described in detail in patent specifications GB-A-2023753 and GB-A-1078791 for example. The variator in this case comprises two input discs or rotors both of which rotate with an input shaft driven by a prime mover. One of these two discs is fixed to the shaft while the other is splined to the shaft so that the disc has freedom for limited displacement in an axial direction. An output disc or rotor lies between the two input discs and two sets of rollers make rolling contact between part-toroidal races formed on the adjacent faces of the input discs and the output disc.

In addition to its function as an input member, the axially displaceable end disc also serves as a piston operative to exert an end load on the variator. This is required to generate the necessary contacting forces between the rollers and the discs to transmit drive. If the variator is subjected to excessive end load efficiency will be low and component life short whereas, if it is inadequate, unacceptable slipping can occur at the roller-disc interface which will result in a loss of traction, a clearly undesirable effect.

GB-A-1 600 974 discloses a variator of the toroidal-race rolling-traction type in which an attempt has been made to compensate for an excess in end loading when the variator components are operating at speed. In this known variator, the outer end of the axially displaceable input disc carries a cylindrical casing divided internally into two chambers and each of these chambers houses one of two annular pistons mounted in tandem on the variator shaft. Each piston separates the relevant chamber into two cavities, one on either side of the piston, and in operation of the variator, the cavity pairs on the rotor side of the pistons are fed by a high pressure fluid while the cavity pairs on the other side of the piston are fed by a low pressure to produce a net end load on the variator as above described. By pressurising both sides of the end-load pistons in this way, the significant radial pressure gradient built up by the fluid in the high pressure cavities when the variator components are rotating at speed will be largely compensated for by the almost identical pressure gradients built up in the fluid present in the low pressure cavities. This enables the effective end-load to be substantially that which would apply if the centrifugal effect were not present i.e. if the end disc and its casing were not rotating. Thus the end loading assembly is what may be referred to as "centrifugally compensated".

In the end load assembly disclosed in GB-A-1600974, the low pressure fluid for the end loader cavities is accessed from the rotor/roller lubrication circuit whilst the high pressure fluid is accessed from the same source as that used for the single-acting roller-control pistons. Consequently, unless the supply pressure is extremely low, it is still possible for the magnitude of the differential end-load to be below that required to maintain traction.

In a variator of the kind above described, the ratio between the tangential (traction) force TF and the normal (perpendicular) force NF at the roller-disc interface is known as the traction coefficient TO. Above a certain value, referred to as the limiting traction coefficient, the roller will slide and traction will be lost. This means that with the system of GB-A-1 600 974, full centrifugal pressure compensation can only be used if the low pressure supply is at very low pressure.

SUMMARY OF THE INVENTION

According to a first aspect of the present invention there is provided a variator assembly comprising a variator of the toroidal-race rolling-traction type having input and output discs, hydraulic piston actuated rollers positioned between said discs and operative to transmit traction therebetween and end loading means for biasing the discs into engagement with each other, in which a hydraulic control means is operative to vary the end load in sympathy with changes in the (net) force exerted by the roller-control piston so as to maintain the traction coefficient at the roller-disc interface consistently below the limit at which traction would be lost.

Preferably said control means comprises means for varying the end load in accordance with a predefined function of the force exerted by the roller-control pistons.

In a particularly convenient arrangement said control means comprises means for varying the end load in proportion to the pressures exerted by the roller-control pistons.

Advantageously, the roller control pistons comprise double-acting pistons exerting a force controlled by the difference between the pressures in the control means, and the end-loading means comprises means for applying an end-load proportional to the force exerted by the roller-control piston.

Preferably, the double-acting roller-control pistons comprise opposed piston heads sliding within separate co-axial cylindrical caps each of which is fed by a separate source of hydraulic fluid.

Alternatively, the double-acting roller-control pistons comprise single-headed pistons within a cylindrical chamber, opposite faces of each said piston being exposed to separate sources of hydraulic fluid the pressure of which is controllable independently of the other.

Conveniently, the end-loading means comprises a high pressure chamber and a compensating pressure chamber the latter of which is provided with hydraulic fluid at a pressure equal to the lower of the two pressures acting on the roller-control pistons.

Preferably, the high pressure chamber of the end load means is provided with hydraulic fluid at a pressure equal to the higher of the two pressures acting on the roller-control pistons.

Advantageously, the control means includes parallel first and second hydraulic circuits each of which is supplied with its own hydraulic fluid from one or other of said sources by means of its own pump and each of which is provided with its own pressure control value for creating a desired pressure within that circuit.

Preferably, the variator includes a higher-pressure-wins valve connected between the first and second hydraulic circuits for supplying fluid at the higher of the two pressures in the circuits to the high pressure chamber of the end-loading means.

Advantageously, the variator also includes a lower-pressure-wins valve connected between the first and second hydraulic circuits for supplying fluid at the lower of said two pressures to the compensating chamber of the end-loading means.

In one arrangement, the variator includes a lubrication circuit having means for controlling the pressure therein and in which said lubrication circuit is connected for supplying fluid at a controlled pressure to the compensating chamber of the end-loading means.

A lower-pressure-wins valve suitable for use with a variator as described above may comprise first and second inlets for receiving fluid at first and second pressures, an outlet for the fluid at the lower of the two pressures supplied to the valve and obturator means responsive to said first and second pressures to facilitate the passage of only the lower pressure fluid to said outlet.

In a particular arrangement of the lower-pressure-wins valve, the obturator means comprises a duct in fluid communication at a first end with the source of high pressure fluid, at a second end with the source of low pressure fluid and at an intermediate point to said outlet, each end of said duct having a sealing land for co-operation with one or other of a pair of sealing members, said sealing members being spaced apart by an amount greater than the distance between said sealing lands by a spacer member extending therebetween, such that, in operation, the fluid at the higher pressure causes movement of the sealing members to obturate the end associated with the high pressure fluid and unobturate the end associated with the low pressure fluid, thereby to cause low pressure fluid to be passed to the outlet.

The present invention also provides a valve comprising first and second chambers and a double headed piston having a first head within the first chamber and a second head in the second chamber, said first head acting to divide the first chamber into two portions the first of which has an inlet for receiving hydraulic fluid from a first source and the second portion having a second inlet for receiving hydraulic fluid from a second source, said second head being operably connected to the first head by a joining member and being movable therewith. The second chamber having a first inlet for receiving hydraulic fluid from a source, an outlet for supplying hydraulic fluid to another apparatus and a second obturatable outlet at low (or zero) pressure, the arrangement being such that the pressure of the hydraulic fluid in the second chamber will be proportional to the difference between the pressures in the first chamber.

BRIEF DESCRIPTION OF THE DRAWING(S)

Embodiments of the present invention will now be described in more detail, by way of example only, with reference to the accompanying drawings, in which:

FIGS. 3 and 4 illustrate first and second end-load assemblies for the variator;

DESCRIPTION OF THE PREFERRED EMBODIMENT(S)

Figure 1:
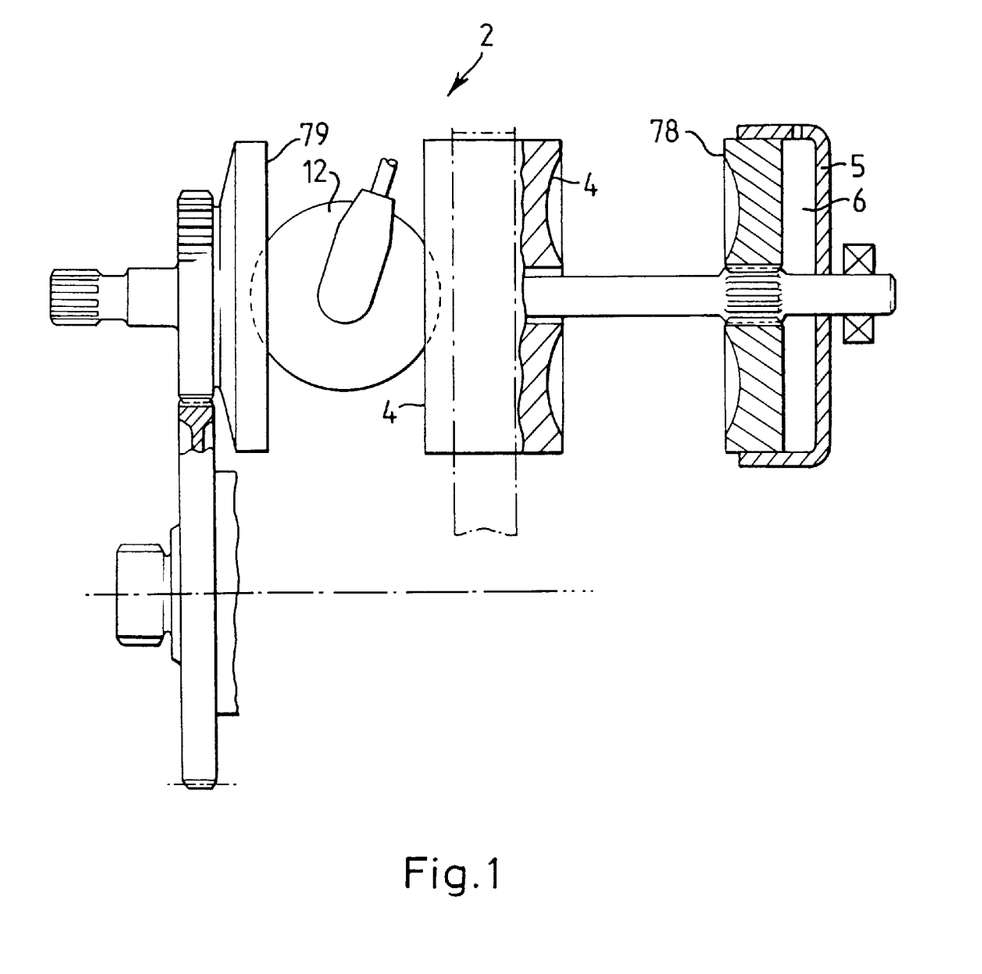
FIG. 1 is a cross-sectional view of a variator incorporating a simple form of differential end load mechanism.

Referring briefly to FIG. 1, a variator 2 comprises a pair of input rotor discs 78, 79, an output rotor disc 4 and a plurality of rollers 12 situated therebetween for transmission of torque in a manner well known to those skilled in the art and therefore not described in detail herein. At the end of the variator 2 there is provided an end-load assembly 5 which, in its simplest form, comprises a simple hydraulic chamber 6 fed with hydraulic fluid at pressure. The pressure created in chamber 6 acts to load disc 78 axially such that it securely clamps the rollers 12 between the discs 78, 79 and ensures the efficient transmission of torque across the variator. As mentioned above, the magnitude of this end-load should not fall below a value at which traction would be lost or be so high as to compromise efficiency and the life of the transmission. A method of controlling the magnitude of the end-load is described later herein.

Figure 2:
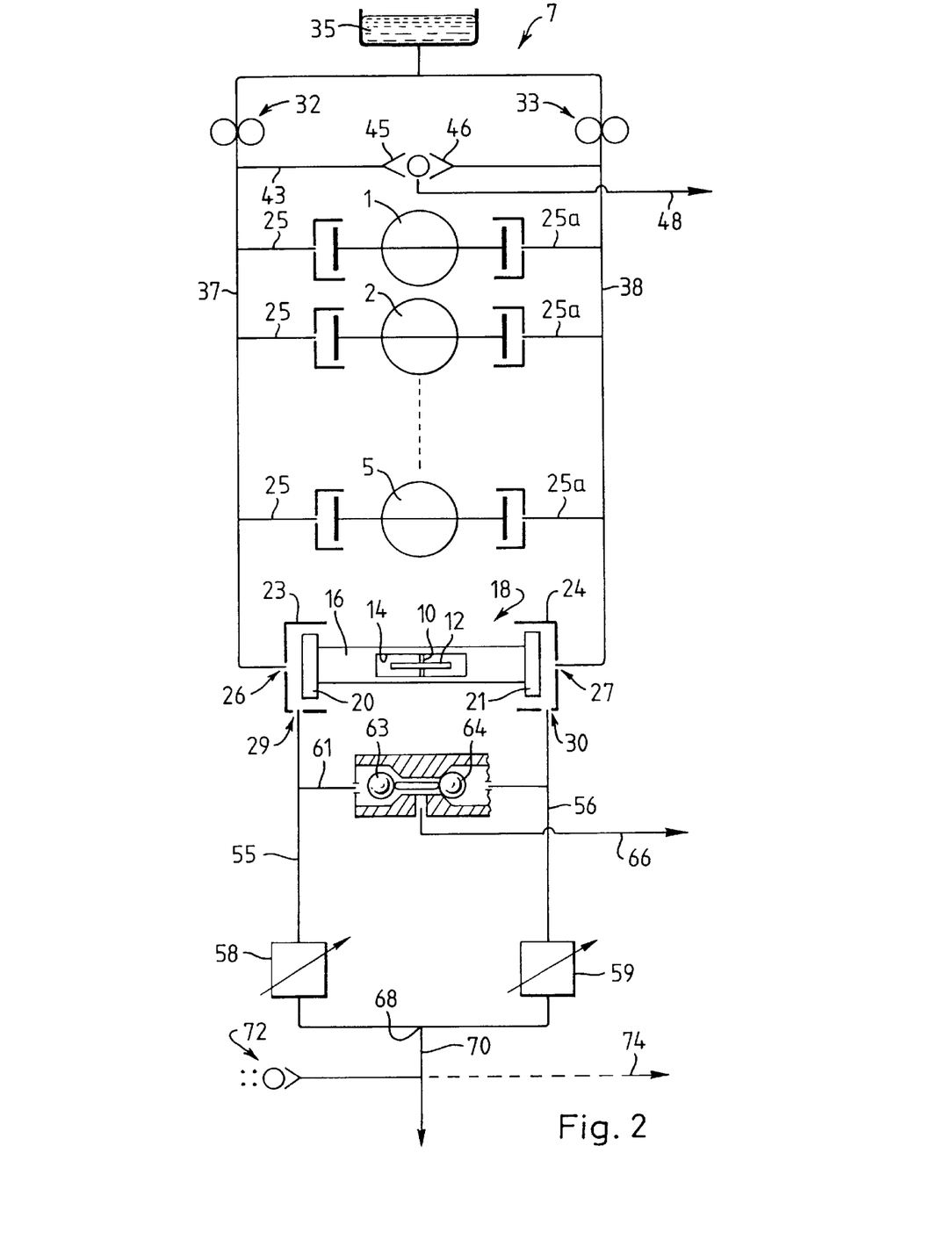
FIG. 2 is a schematic representation of a control system for a toroidal-race rolling-traction variator and illustrates various aspects of the present invention.

Turning now to FIG. 2, which illustrates a control system 7 of the present invention, it will be appreciated that the axle 10 of a master roller 12 of the variator is mounted in the cavity 14 of the hollow shaft 16 of a double-acting piston 18. This piston is formed with opposed piston heads 20, 21 which slide under hydraulic load within coaxial cylindrical caps 23, 24 and which are free to rotate about the axis of shaft 16. A single-headed version of the same piston, with opposite faces of the single head both exposed to fluid, would also be possible.

Hydraulic fluid inlets 26, 27 and outlets 29, 30 are formed in the end and side walls of caps 23, 24 respectively, and by means of a plurality of similar supply branches 25, 25a also feeding the end caps of the slave cylinders. The pressures in the corresponding slave cylinders of the remaining rollers (1–5) are related to those in caps 23, 24 so that the traction forces are equal.

It is also well known in the art (as explained in detail in GB-A-979062, for example) to mount the first roller within the caps 23, 24 and to align the axes of the caps so that they are substantially tangential to the centre circle of the imaginary toruses of which the rotor races form part, but with a small inclination known as the "camber" or "caster" angle (CA). With such an arrangement, the use of hydraulic end stops is facilitated as each axial position of the roller carriage is related to an equilibrium ratio angle.

A hydraulic control circuit for such a transmission comprises two sources of hydraulic fluid provided by oil pumps 32, 33 capable of delivering hydraulic fluid from a sump 35 at, for example, between 30 to 50 bar to left-hand and right-hand upstream flow lines 37 and 38 and it is these lines that deliver the fluid respectively to the cylinder inlets 26 and 27. Such pumps will, however, not provide hydraulic fluid at these pressures unless control values (58, 59) or their respective hydraulic outlets (29, 30) are sufficiently restricted. A cross-connection 43 between lines 37 and 38 communicates by way of a 'higher-pressure-wins' arrangement of non-return valves 45 and 46 and via a conduit 48, with the main (high pressure) chamber of the end load mechanism of the transmission, that is to say the chamber 50 in FIGS. 3 and 4. This ensures that chamber 50 is always fed with fluid at a pressure equal to the higher of the two pressures in lines 37 and 38.

Outlets 29 and 30 from caps 23 and 24 lead by way of downstream left-hand and right-hand lines 55 and 56 to the inlets of two electro-hydraulic proportional pressure control valves 58 and 59, the operation of which is described later herein.

Figure 3:
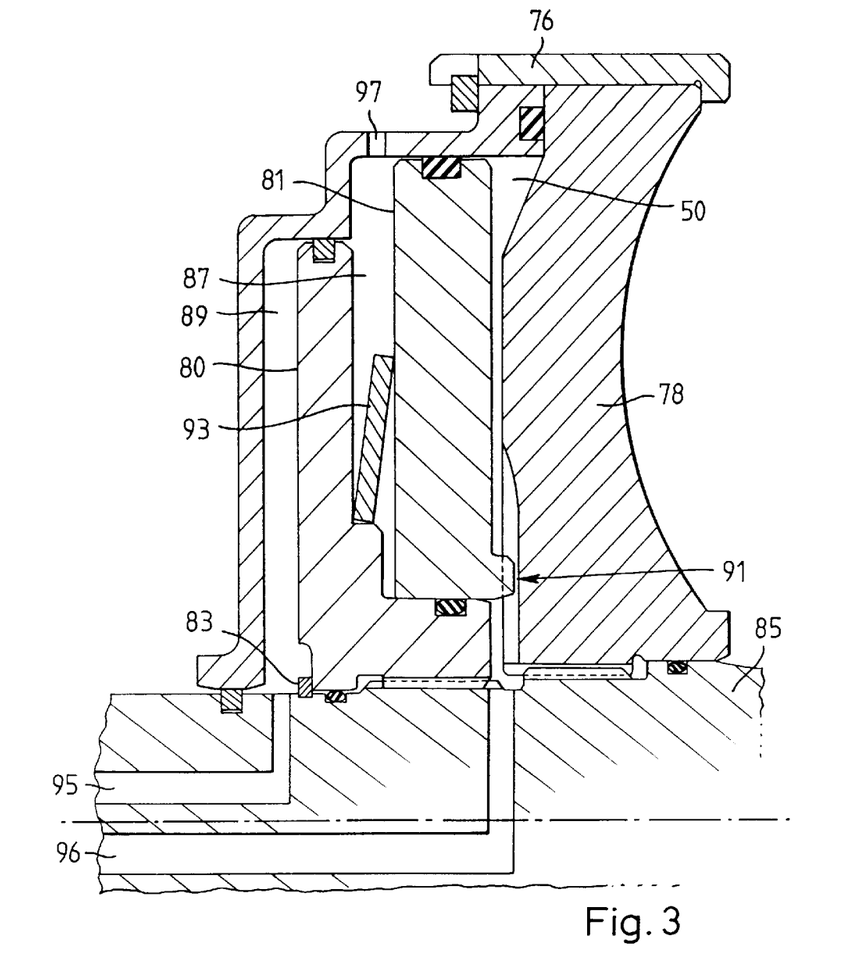
Figure 4:
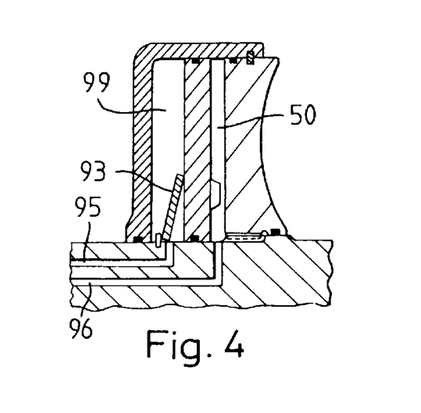

A cross-connection 61 between left-hand and right-hand lines 55 and 56 communicates by way of a 'lower-pressure-wins' arrangement of valves 63 and 64, and a connection 66 connects with a compensation chamber of the end load mechanism of the transmission, that is to say the chamber 89 in FIG. 3 or 99 in FIG. 4. Between them, valves 63, 64 ensure that the compensating pressure in the end load arrangement is always equal to the lower pressure in the roller control cylinders 23, 24. As an alternative, items 61–66 may be relocated adjacent items 43–46.

Downstream of the control valves 58 and 59, the left and right hand fluid lines combine at 68 after which a connection 70 is operable to provide fluid for general lubrication of the transmission. This is maintained at the correct back pressure by pressure relief valve 72. Reference numeral 74 indicates an alternative connection (at back pressure) for the end load compensating assembly (in place of connection 66).

Returning now to FIG. 3, a suitable variator end load mechanism comprises a hollow casing member 76 secured to an input rotor 78 of the variator and main and auxiliary pistons 80, 81 housed within the casing member. Reference numeral 83 indicates an end stop for piston 80. The rotor 78, piston 80 and spacing assembly 91 are splined either directly or indirectly to the variator shaft 85 and annular seals indicated in the Figure hydraulically isolate from one another the main end load chamber 50 (between rotor 78 and pistons 80,81), the pre-load chamber 87 (between piston 80 and piston 81), and the so-called compensation chamber 89 (between the piston 80 and the end wall of the casing member 76). Spacing assembly 91 limits the distance of closest approach between the piston 81 and rotor 78.

The mechanism is completed by a Belleville disc spring 93 acting between the outer face of auxiliary piston 81 and the adjacent stepped face of the main piston 80 and by passageways 95, 96, 97 connecting the chambers 89, 50 and 87 with hydraulic lines 66 and 48 and atmosphere respectively. Alternatively, passageway 95 could be arranged to connect chamber 89 with the system back pressure.

Figure 7:
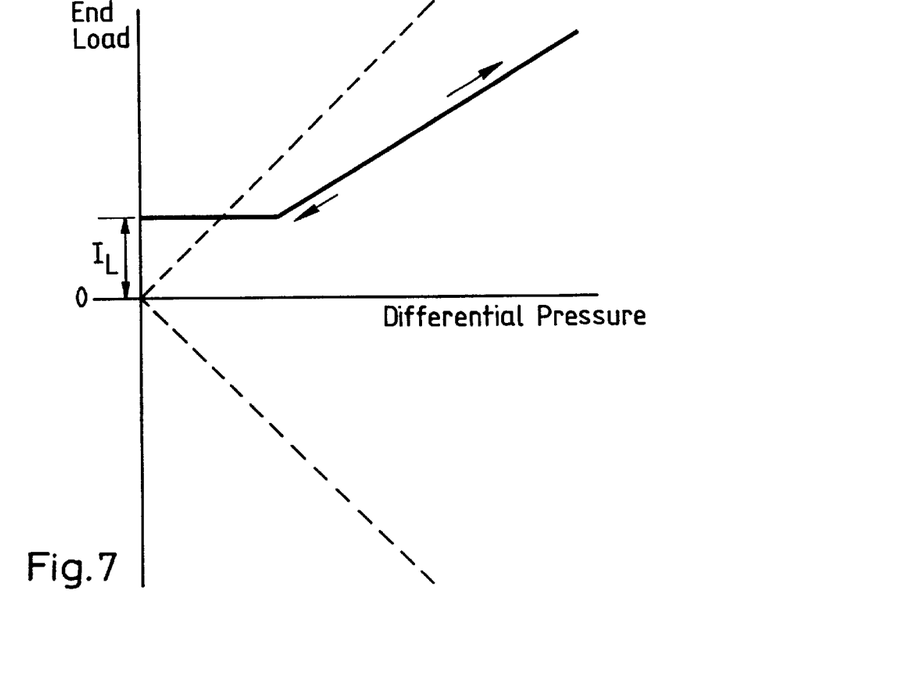
FIGS. 7 and 8 illustrate the effect the pre load spring has on end load and how its effect can be cancelled hydraulically.
Figure 8:
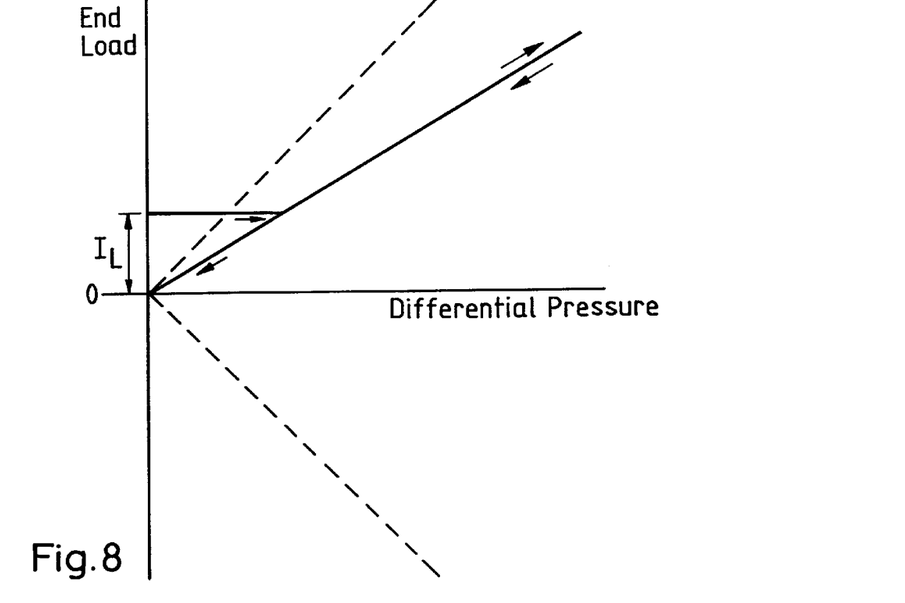

Once in operation, the end load mechanism is full of oil and rotates at the variator input speed. However, initially the variator must resist finite inertia loads during the rapid accelerations experienced by the transmission at engine start. Since the hydraulic pumps are also engine driven and hydraulic end load is not available, an alternative end load device must be provided and this is supplied by the Belleville spring fitted between the two pistons 80, 81. It will therefore be understood that the arrangement applies mechanical end load during engine start, but that this pre-load can be cancelled hydraulically, to any degree, depending upon the physical dimensions of the assembly and the applied pressures. The operation of the Belleville spring is best illustrated by reference to FIGS. 7 and 8 from which it will be appreciated that the total end load pressure is a product of the Belleville spring load IL, the pressure (CP) in the high pressure chamber and the pressure (TP) in the compensating chamber. The initial spring load IL is only overcome once the differential pressure (CP–TP) is greater than IL and thenceafter, the end load pressure rises in a proportional relationship with the differential pressure, the specifics of which depend very much on the size relationships of the piston between the HP and CP chambers. FIG. 8 illustrates that the effect of spring load IL can be cancelled hydraulically by raising both HP and CP in a controlled manner so as to eliminate the loading effect of the spring. This is aptly demonstrated by reference to the lower portion of FIG. 8 from which it will be appreciated that the effect of the spring can be cancelled such that the end load passes through zero as the load is removed. Other variations will however present themselves to a person skilled in the art.

Having the compensation chamber supply at trailing pressure (TP) means that it will both cancel the flow losses of the system and also provide true differential end load variator control.

In operation, electro-hydraulic proportional pressure control valves 52, 59 are operated in a manner well known to create the desired back pressures in lines 55, 56 and end caps 23, 24 in order to effect movement of the master rollers 12 to a desired position. In effect, it is the difference between the higher line pressure (control pressure) and the lower line pressure (trailing pressure) that determines the torques in the transmission. Thus, the rollers are said to be under "differential control". As already described, the end load arrangement also employs the difference between the higher and the lower of the two pressures in the hydraulic circuit and, hence, is also under "differential control".

Figure 5:
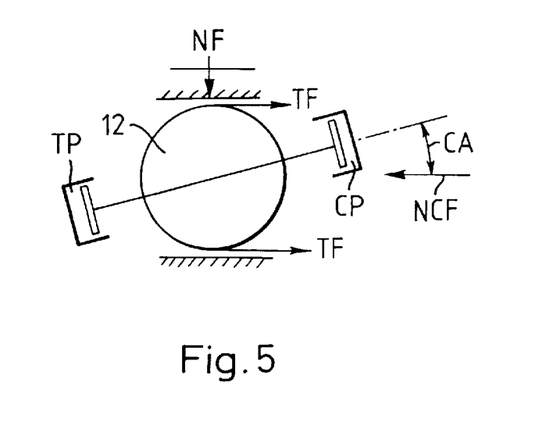
FIG. 5 is a scrap view of part of the variator and illustrates the relationship between the normal force (NF) and the traction forces (TF) as discussed in the text.

The basic hydraulics of the new system ensures that the tangential traction force (TF) is equal to half the net force applied by the control pressure (CP) acting on the double-acting roller-control pistons less the trailing pressure (TP) in the transverse plane of the variator. This is illustrated in FIG. 5 where NCF and TF respectively indicate the net control force in the transverse plane and the traction force, TP and CP indicate the trailing pressure and the control pressure, and CA indicates the castor angle.

It will be appreciated that, by providing differential control to both the roller and end-load arrangements, it will be possible to ensure that the total end load NF (a product of CP–TP) varies in sympathy with the net pressure (CP–TP) applied to the roller control pistons. Consequently, the magnitude of the total end load NF is directly linked to the magnitude of the traction force TF and, hence the traction coefficient (ratio of TF/NF) will remain constant throughout variator operation. Maintenance of the traction coefficient below a particular predetermined value at which slipping would normally occur is therefore achieved automatically.

Turning now to the alternative end-loading arrangement of FIG. 4, it will be appreciated that a constant and near optimum traction coefficient is obtained by using an end load cylinder with two chambers 50, 99 of equal dimensions, one (50) at control pressure (plus its centrifugal head) opposed by the other (99) at trailing pressure (plus its equal centrifugal head) so as exactly as possible to match changes in the roller-related traction force at the roller/disc interface with changes in the end-load-related perpendicular forces there. In this Figure, the same reference numerals have been used as in FIG. 3 to indicate structurally or functionally similar items. In modifications (as indicated in FIG. 3) of the end load assembly, the dimensions of the compensating and high pressure chambers can differ, if desired, so as to give less than full centrifugal pressure compensation to allow for falling traction coefficients with speed.

It will be noted that the variator control system of the present invention compares very favourably with that of GB-A-1 600 974 because as a result of there being no effective trailing pressure in the roller-control pistons in this prior arrangement, any low pressure applied there for end load compensation will increase the operating traction coefficient with the attendant danger of exceeding the limiting value, and the undesirable consequences already outlined above.

In an alternative embodiment of the present invention, the compensation pressure is accessed from the lubrication point 70 in the FIG. 2 circuit (back pressure) rather than from the line 66 (trailing pressure). However, it should be noted that back pressure, although not requiring a 'lower-pressure-wins' valve assembly, does not fully compensate for the trailing pressure because of pressure drops (flow losses) in the circuit.

Figure 6:
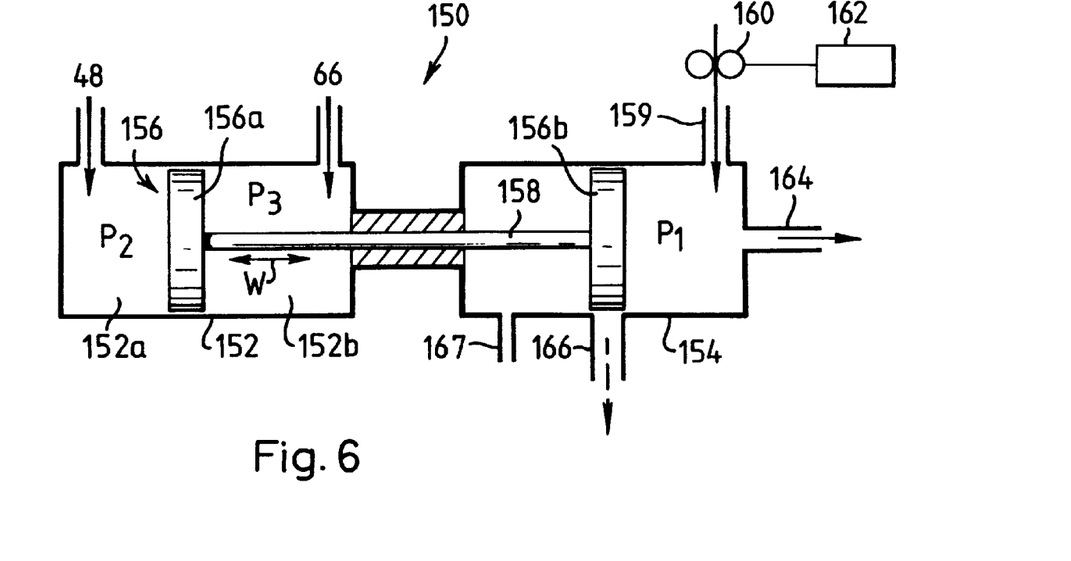
FIG. 6 is a schematic view of a pressure control device suitable for providing an end load pressure which varies in sympathy with changes in the net pressure exerted by the roller control pistons of the present invention.

From the above it will be appreciated that the prime function of the present invention is to vary the end load in sympathy with changes in the net force exerted by the roller-control pistons so as to maintain the traction coefficient (CT) at the roller-disc interface consistently below a limit at which traction would be lost. Whilst the above apparatus provides one possible way of achieving this effect, it will be appreciated that any one of a number of different methods may be employed. For example, one might employ a valving arrangement 150 as shown in FIG. 6 which comprises first and second chambers 152, 154 respectively and a double headed piston arrangement shown generally at 156. The first piston 156a is contained within first chamber 152 and acts to divide it into two portions 152a, 152b fed with hydraulic fluid from the highest-pressure-wins and lowest-pressure-wins valving arrangements respectively. The second piston 156b is contained within the second chamber and is operably connected via joining member 158 to the first piston 156a for movement therewith. On a side remote from joining member 158 the second chamber is provided with an inlet 159 for receiving hydraulic fluid from an independently operable pump 160 under the control of controller 162. A first outlet 164 from the second chamber supplies hydraulic fluid for end load purposes and may supply a simple single chamber end load arrangement such as that shown in FIG. 1. It will be appreciated that this outlet may be replaced with a simple outlet (not shown) in inlet 159. A second outlet 166 is positioned below piston 156b and acts to return hydraulic fluid to sump 35 (FIG. 2). The positional relationship between piston 156b and outlet 166 is such that the piston acts to control the flow through outlet 166 and, hence, pressure $P_1$ and the magnitude of the endforce. Should $P_1$ rise above a pre-determined value, piston 156b moves to open the outlet and restore the correct pressure. Conversely, should it prove necessary, piston 156b can move to obturate the outlet 166 (either partially or completely) and restore pressure. A further outlet 167 is provided to drain the area behind piston 156b and allow for the escape of air trapped therebehind. If desirable, outlet 167 could be positioned such that it also provides a pressure release in the event of excessive pressure build up. Alternatively one could employ controller 162 to vary the output of pump 160 and hence pressure $P_1$ such that it never exceeds a pre-determined value. Such a situation might, for example, arise at high rotational speeds where the centrifugal pressure effect experienced by the hydraulics in the end-load mechanism has a significant and adverse effect on the total end load.

In operation, hydraulic pump 160 is operated and creates a pressure P1, in second chamber 154 which acts on second piston 156b and also supplies hydraulic pressure for end-load purposes. The pressure P2, P3 experienced on either side of the first piston 156a, are equal to the high and low pressure in lines 48 and 66 respectively. The difference between P2 and P3 is used against P1 such that piston 156b moves in the direction of one or other of the arrows W depending on the magnitude of the difference between P1 and P2–P3 so as to increase or decrease the resistance in outlet 166. It will be appreciated that this arrangement allows one to vary the magnitude of the end load pressure and hence end load force in sympathy with the net pressure exerted on the roller-control pistons (P2–P3) as P2 and P3 are the control pressure CP and trailing pressure TP of the roller-control pistons. Consequently, in this simple arrangement a two chamber end-load device is not absolutely necessary and the arrangement can, to some extent, be simplified. The exact relationship between P1, P2 and P3 is dependent upon the relative sizes of pistons 156a, 156b which can be modified to provide any required relationship. For example, pistons of the same size would cause P1 to vary in exact proportion to the difference between P2 and P3 whilst other sizes would modify this. In the event that P1 ever reaches a pressure at which the end load would be such as to cause the traction coefficient limit to be exceeded, piston 156b would move to a position in which it obturates outlet 166 and pressure is restored.

For completeness, it should be added that two factors modify the relationship as described above between the end load and the normal force at the roller/disc interface. First, for a given end load, the force will increase in inverse proportion to the cosine of the roller ratio angle (0° at 1:1). Secondly, there will be a difference between the normal forces at the end and centre discs resulting from the axial component of the net control force on the roller—this will be equal to the net force times the sine of the castor angle. As both these effects are relatively small, they are ignored in the above treatment.

Figure 9:
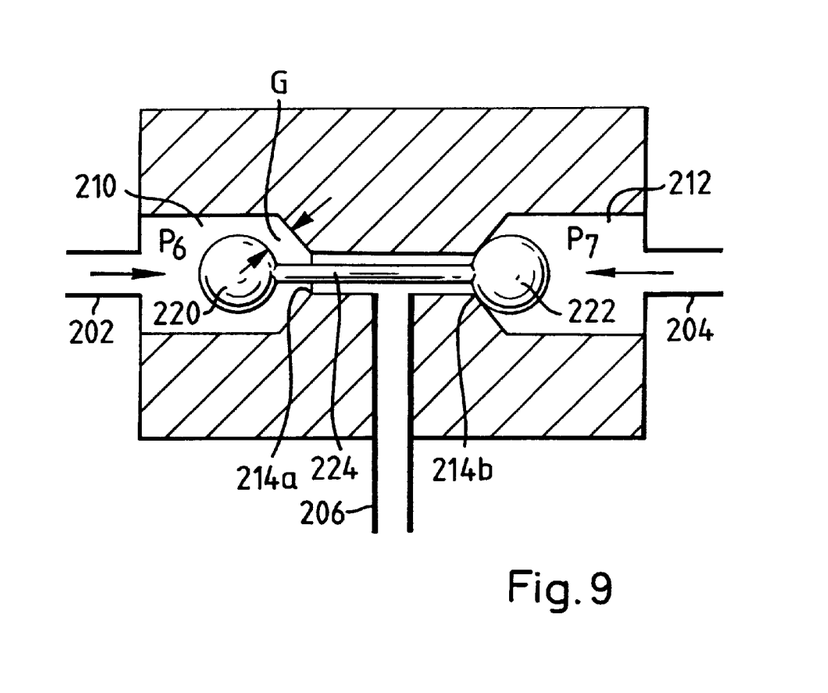
FIG. 9 is an enlarged view of the lower-pressure-wins valve of FIG. 2.

The lowest-pressure-wins valve of FIG. 2 and FIG. 9 may find use in a number of applications other than those described above and this valve is therefore now described in more detail. In particular, the valve 200 comprises first and second inlets 202, 204, for receiving fluid at first and second pressures P6, P7, outlet 206 for receiving fluid at the lower of the two pressures P6, P7 and an obturator means shown generally at 208 responsive to the different pressures to facilitate the passage of only the lowest pressure fluid to said outlet 206. The valve further includes two chambers 210, 212 each associated with a respective inlet and a duct 214 in fluid communication at a first end 214a with chamber 210 and at its otherwise free second end 214b with chamber 212. A mid point of the duct 214 is connected to the valve outlet 206 for the passage of fluid in a manner to be described later. Each end of the duct includes a sealing land 216, 218. Further features of the valve comprise a pair of sealing members shown in the form of, for example, balls 220, 222 (63, 64 in FIG. 2) which are each free to move within the constraints of respective chambers 210, 212 and act to either cover or uncover respective ends of duct 214. The two sealing members 220, 222 are spaced apart by an amount greater than the distance between said sealing lands by a spacer member 224 extending therebetween such that, in operation, the fluid at the higher pressure causes movement of the sealing members to obturate the end associated with the higher pressure and maintain a given distance or gap G between the sealing member associated with the lower pressure fluid (220 in FIG. 9). In this arrangement, the opening into duct 214 remains uncovered and the lower pressure fluid is free to pass to outlet 26, thereby to provide fluid at the lower of the two pressures for subsequent use.

What is claimed is:

1. A variator assembly comprising a toroidal-race rolling-traction variator having input and output discs (78,79), at least two hydraulic control pistons being connected to a plurality of rollers, said plurality of rollers (12) being positioned between said discs and operative to transmit traction therebetween, and end loading means (89,50) to bias one of said disc towards the other of said discs, hydraulic control means operative to vary an end load in sympathy with changes in the force exerted by the control pistons so as to maintain the traction coefficient at the roller-disc interface consistently below the limit at which traction would be lost, wherein that the control pistons comprise double-acting pistons controlled by a difference between a pressure of a first hydraulic circuit and a pressure of a second hydraulic circult, and by a high-pressure-wins valve (45,46) located between said first and second hydraulic circuits of said hydraulic control means to supply fluid at a higher of two pressures in the circuits to a high-pressure chamber of the end loading means, a low-pressure-wins valve (63,64) is located between said first and second hydraulic circuits to supply fluid at a lower of two pressures in the circuits to a compensating chamber of the end loading means.

2. The variator as claimed in claim 1 wherein said control means comprises means for varying the end-load in accordance with a predefined function of the force exerted by the control pistons.

3. The variator as claimed in claim 1 wherein said control means comprises means for varying the end-load in proportion to the force exerted by the control pistons.

4. The variator as claimed in claim 1 wherein the end loading means comprises means for applying an end-load force proportional to the force exerted by the control pistons.

5. The variator as claimed in claim 4 wherein the double-acting control pistons comprise opposed piston heads sliding within separate co-axial cylindrical caps each of which is fed by a separate source of hydraulic fluid.

6. The variator as claimed in claim 4 wherein the double-acting control pistons comprise single-headed pistons within a cylindrical chamber, opposite faces of each said piston being exposed to separate sources of hydraulic fluid the pressure of which is controllable independently of the other.

7. The variator as claimed in claim 4 wherein the double-acting control pistons are exposed to two separate sources of hydraulic fluid the pressure of which are each independently controlled, and the end-loading means comprises the high pressure chamber and the compensating pressure chamber and the compensating pressure chamber is provided with hydraulic fluid ata pressure equal to the lower of the two independently controlled pressures acting on the control pistons.

8. The variator as claimed in claim 7 wherein the high pressure chamber of the end load means is provided with hydraulic fluid at a pressure equal to the higher of the two independently controlled pressures acting on the control pistons.

9. The variator as claimed in claim 4 wherein said first and second hydraulic circuits are parallel to one another and each circuit is supplied with its own hydraulic fluid from a respective pressuring pump and each circuit is provided with its own pressure control valve for creating a desired pressure within that circuit.

10. The variator as claimed in claim 9 in combination with a transmission, wherein said variator further includes a lubrication circuit for supplying a lubricating fluid to the transmission.

11. The variator as claimed in claim 1 wherein the low-pressure-wins valve comprises first and second inlets for receiving fluid at first and second pressures, an outlet for the fluid at the lower of the two pressures supplied to the valve and obturator means responsive to said first and second pressures to facilitate the passage only of the lower pressure fluid to said outlet.

12. The variator as claimed in claim 1 wherein said obturator means comprises a duct in fluid communication at a first end with the source of high pressure fluid, at a second end with the source of low pressure fluid and at an intermediate point to said outlet each end of said duct having a sealing land for co-operation with one or other of a pair of sealing members, said sealing members being spaced apart by an amount greater than the distance between said sealing lands by a spacer member extending therebetween, such that, in operation, the fluid at the higher pressure causes movement of the sealing members to obturate the end associated with the high pressure fluid and unobturate the end associated with the low pressure fluid thereby to cause low pressure fluid to be passed to the outlet.

13. A variator assembly comprising a toroidal-race rolling-traction variator having input and output discs (78, 79), at least two hydraulic control pistons being connected to a plurality of rollers, said plurality of rollers (12) being positioned between said discs and operative to transmit traction therebetween, and end loading means (89,50) to bias one of said disc towards the other of said discs, hydraulic control means operative to vary an end load in sympathy with changes in the force exerted by the control pistons so as to maintain the traction coefficient at the roller-disc interface consistently below the limit at which traction would be lost, wherein that the control pistons comprise double-acting pistons controlled by a difference between a pressure of a first hydraulic circuit and a pressure of a second hydraulic circuit, and by a first valve (45,46) communicating with said first and second hydraulic circuits of said hydraulic control means to supply fluid at a higher of two pressures in the first and second hydraulic circuits to a high-pressure chamber of the end loading means, and a second valve (63,64) communicating with said first and second hydraulic circuits to supply fluid at a lower of two pressures in the first and second hydraulic circuits to a compensting chamber of the end loading means.

* * * * *